United States Patent
Buck et al.

(10) Patent No.: US 7,844,932 B2
(45) Date of Patent: Nov. 30, 2010

(54) METHOD TO IDENTIFY TIMING VIOLATIONS OUTSIDE OF MANUFACTURING SPECIFICATION LIMITS

(75) Inventors: Nathan C. Buck, Underhill, VT (US);
John P. Dubuque, Jericho, VT (US);
Eric A. Foreman, Fairfax, VT (US);
Peter A. Habitz, Hinesburg, VT (US);
Chandramouli Visweswariah, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 12/045,915

(22) Filed: Mar. 11, 2008

(65) Prior Publication Data

US 2009/0235217 A1    Sep. 17, 2009

(51) Int. Cl.
*G06F 17/50* (2006.01)
*G06F 9/45* (2006.01)

(52) U.S. Cl. .................. 716/6; 716/1; 716/2; 716/3; 716/4; 716/5; 716/10; 716/19; 716/20; 716/21

(58) Field of Classification Search .............. 716/1–6, 716/10
See application file for complete search history.

(56) References Cited

U.S. PATENT DOCUMENTS

| | | | |
|---|---|---|---|
| 6,553,338 B1 | 4/2003 | Buch et al. | |
| 7,346,874 B1 * | 3/2008 | Burks | 716/6 |
| 7,401,307 B2 * | 7/2008 | Foreman et al. | 716/6 |
| 7,681,157 B2 * | 3/2010 | Buck et al. | 716/6 |
| 2008/0052656 A1 * | 2/2008 | Foreman et al. | 716/6 |
| 2008/0209374 A1 * | 8/2008 | Buck et al. | 716/6 |
| 2008/0216036 A1 * | 9/2008 | Foreman et al. | 716/6 |
| 2009/0265674 A1 * | 10/2009 | Buck et al. | 716/6 |
| 2009/0271751 A1 * | 10/2009 | Fatemi et al. | 716/6 |

OTHER PUBLICATIONS

Wu et al.; "Delay variation tolerance for domino circuits"; Publication Year: 2006; Design Automation, 2006. Asia and South Pacific Conference on.*

Chen et al.; "Performance-impact limited area fill synthesis"; Publication Year: 2003 ; Design Automation Conference, 2003. Proceedings; pp. 22-27.*

Guthaus et al.; "Gate sizing using incremental parameterized statistical timing analysis"; Publication Year: 2005; Computer-Aided Design, 2005. ICCAD-2005. IEEE/ACM International Conference on ; pp. 1029-1036.*

* cited by examiner

*Primary Examiner*—Helen Rossoshek
(74) *Attorney, Agent, or Firm*—Gibb I.P. Law Firm, LLC

(57) ABSTRACT

A method of evaluating an integrated circuit design selects manufacturing parameters of interest which are outside of manufacturing specification limits. Then, the method runs timing tests on the integrated circuit design and successively evaluates the timing test results in an iterative process that considers the timing performance sensitivity to the selected manufacturing parameters of interest. The design is made more robust to each parameter out of manufacturing range.

5 Claims, 2 Drawing Sheets

METHOD TO IDENTIFY TIMING VIOLATIONS OUTSIDE OF MANUFACTURING SPECIFICATION LIMITS

BACKGROUND

Field of the Invention

The embodiments of the invention generally relate to testing integrated circuit designs, and more particularly to a method that accounts for timing slack sensitivity to various manufacturing parameters.

SUMMARY

Embodiments herein present a method of evaluating an integrated circuit design by considering specific process variations. The method begins by selecting manufacturing parameters of interest of the integrated circuit design. The parameters of interest represent measurable process parameters in microchip fabrication. The method runs timing tests on the integrated circuit design and successively evaluates the test results in an iterative process by verifying timing passes when the parameters of interest are adjusted to model manufacturing outside of specified limit.

The iterative process involves determining if timing slack margin (the amount by which the timing of the circuit exceeds absolute minimum timing requirements) of one of the timing tests is below a predetermined timing slack margin limit (is too low). If the timing slack margin is too low, this identifies failing timing tests. For each of the failing timing tests, the method calculates the sensitivity of timing slack to each of the manufacturing parameters of interest. This "sensitivity" is the amount a change in the parameter will affect the timing performance of the circuit design. For each manufacturing parameter of interest, the method extrapolates the slack such that it models product measurement beyond a predetermined wafer acceptance criteria (WAC), that is with a higher level of coverage with respect to the manufacturing parameter.

Then the slack margin is compared to this "adjusted" sensitivity value to determine if slack margin is still too small. If the slack margin is too low, this identifies failing timing for sensitivities that need to be changed (the circuit design is changed to reduce timing test sensitivity to the failing manufacturing parameters); otherwise, the circuit design does not need be adjusted. This produces a modified integrated circuit design which is eventually output after all iterations and adjustments are made.

If the timing tests of the integrated circuit design have timing slack below the allowed timing slack margin, the integrated circuit design would have previously been classified as defective; however, by changing the design to reduce the sensitivity to such parameters, this processes changes the integrated circuit design to be acceptable.

These and other aspects of the embodiments of the invention will be better appreciated and understood when considered in conjunction with the following description and the accompanying drawings. It should be understood, however, that the following descriptions, while indicating embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF EMBODIMENTS

Figure 1:
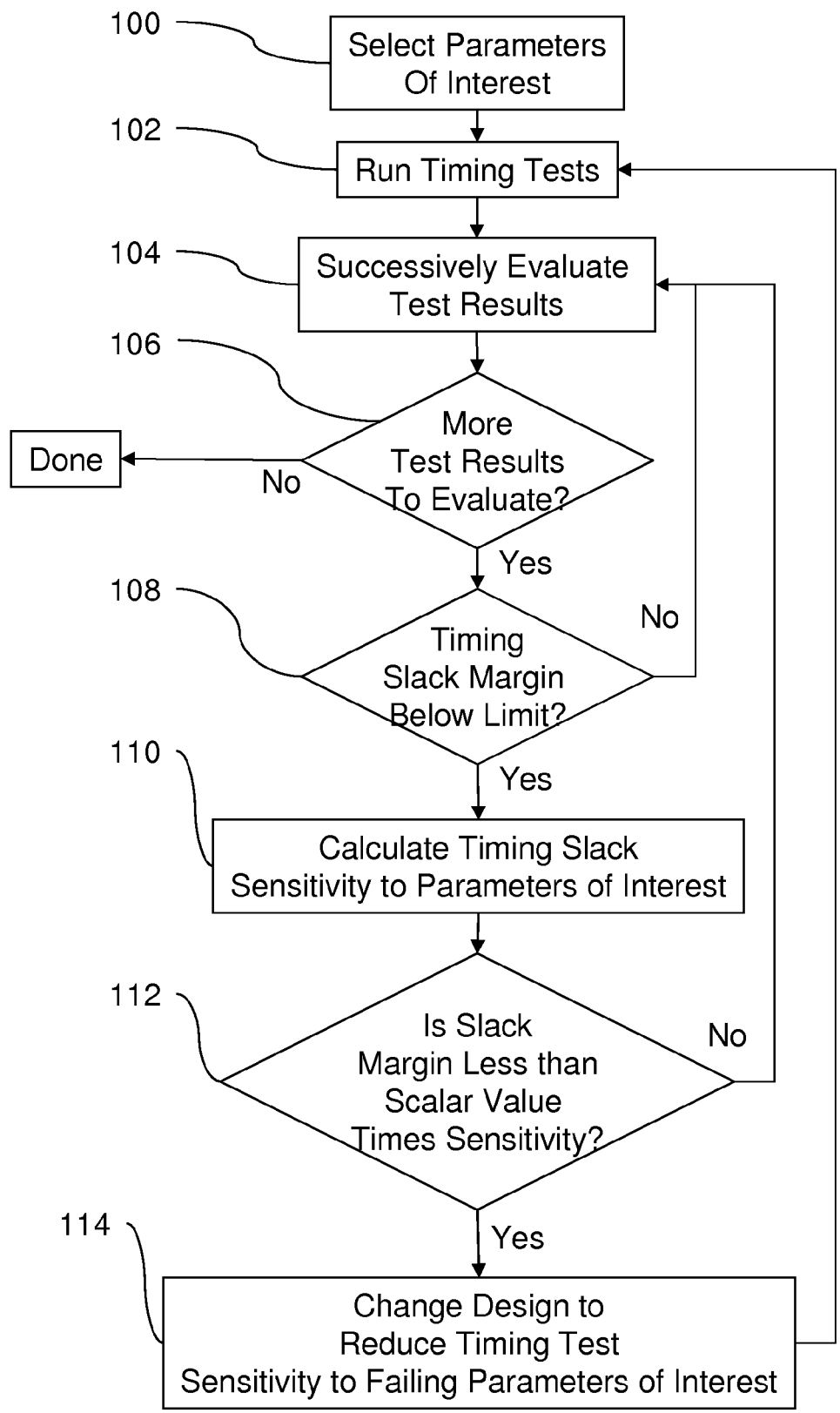
FIG. 1 is a flow diagram illustrating a method embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

In manufacturing process, each particular process variation may not be treated with the same restrictions. Depending upon the process parameter importance and impact on the final product, some manufacturing parameters may be allowed to go beyond their 3 sigma measurement limits without having to throw out the wafers on which the data was measured. The embodiments herein provide a systematic method for utilizing this principle that calculates timing slack sensitivity to various manufacturing parameters.

As shown in flowchart form in FIG. 1, embodiments herein present a method of evaluating an integrated circuit design. The method begins in item 100, by selecting, based on user input, manufacturing parameters of interest of the integrated circuit design. Then, the method runs timing tests on the integrated circuit design (item 102) and successively evaluates the test results in an iterative process (104).

The iterative process involves determining if timing slack margin (the amount by which the timing of the circuit exceeds absolute minimum timing requirements) of one of the timing tests is below a predetermined timing slack margin limit (is too low) in item 108. If not, processing returns to item 104. However, if the timing slack margin is below a threshold this identifies failing timing tests.

For each manufacturing parameter of interest, the method extrapolates the slack such that it models product measurement beyond a predetermined wafer acceptance criteria (WAC), that is with a higher level of coverage with respect to the manufacturing parameter. As shown in item 110, for each of the failing timing tests, a slack sensitivity is extrapolated by statistical timing or other suitable analysis method to each of the manufacturing parameters of interest. This "sensitivity" is the amount a change in the process parameter will affect the timing performance of the circuit design. This sensitivity can be determined by actual testing or by reference to historical records and/or models. The extrapolation comprises one of a linear extrapolation; a quadratic extrapolation, a high-order extrapolation, and a polynomial extrapolation. The extrapolation also comprises a statistical static timing analysis. The method applies the extrapolation simultaneously to any subset of measurement manufacturing parameters. The extrapolation is performed to a wafer acceptance criterion (WAC) limit of the measurement manufacturing parameter.

For each such manufacturing parameters of interest, the method multiplies this sensitivity by a scalar value, such as a production measure or timing value (a predetermined wafer acceptance criteria (WAC) scalar value). The multiplication will increase the sensitivity timing value and therefore produces an adjusted sensitivity timing value. Then the timing slack margin, which was previously considered too low, is compared to this "adjusted" sensitivity value to determining if timing slack margin is still less than the adjusted sensitivity value (item 112). If the slack margin is still too low, this identifies failing manufacturing parameters that need to be changed (the circuit design is changed to reduce timing test sensitivity to the failing manufacturing parameters in item 114); otherwise, the circuit design does not need be adjusted and processing can return to item 104. After item 114, processing also returns to item 104 to process the next test results.

Figure 2:
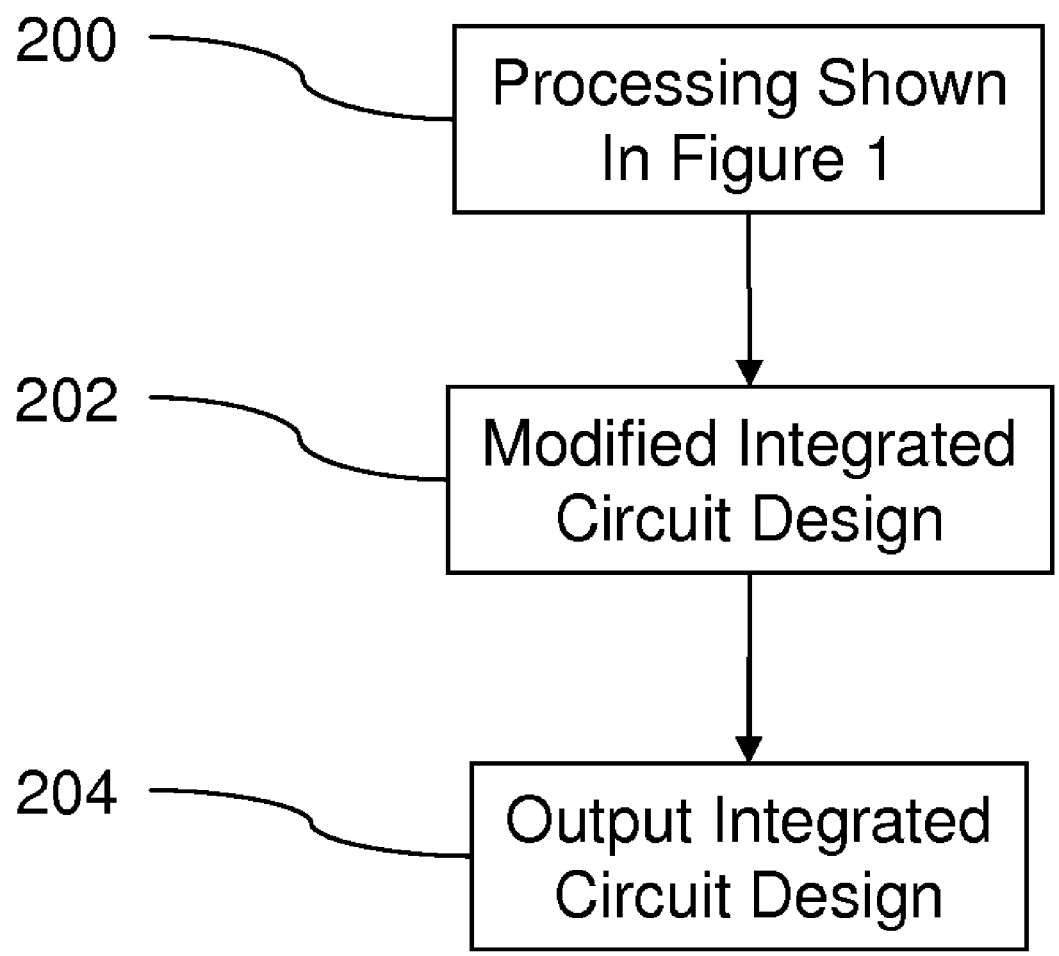
FIG. 2 is a flow diagram illustrating a method embodiment of the invention.

As shown by item 106, this iterative process continues until there are no more test results to evaluate. Thus, as shown in FIG. 2, after the processing in FIG. 1 is completed (item 200); a modified integrated circuit design is produced (item 202) which is eventually output (item 204).

Thus, as shown above, if the timing tests of the integrated circuit design have timing slack below the allowed timing slack margin, the integrated circuit design would have previously been classified as defective; however, by changing the design to reduce the sensitivity to some select parameters, this processes changes the integrated circuit design to be acceptable The method described above applies the notion that most hardware will still work with one process parameter out of the specifications, when most other manufacturing parameters are well within the limits. The safety margin given by these other manufacturing parameters compensates for the one parameter that is out of the limits. However, when the parameter is extremely outside of the specifications it will lead to direct failures, such as opens, shorts, or reliability problems. Therefore all manufacturing parameters have a Wafer Acceptance Criterion (WAC) limit.

The timing methodology can take this process in account to determine when a product would still be considered acceptable, even if a manufacturing parameter were not acceptable. This is done without changing the overall pessimism, as the overall distribution of these 'less important' manufacturing parameters still maintains the limits (e.g., 3sigma limits) used in common integrated circuit design applications.

As described above, in order to find a design exposure for a parameter outside of the acceptable specifications, the timing test sensitivity to this parameter is calculated by embodiments herein. When the sensitivity to a parameter (of the category described above) is large, other manufacturing parameters will not be able to provide a margin that can make the hardware still work. Therefore, embodiments herein change the integrated circuit design to reduce the timing sensitivity to certain parameters. Therefore, the embodiments herein alter the integrated circuit design to adjust the sensitivity of the design to a manufacturing parameter that is outside of an acceptable limit.

An integrated circuit design will be considered acceptable when the margin on the timing test is larger than the sensitivity of each parameter at the manufacturing process limits. So, only the timing tests where the margin is smaller than the sensitivity of a single manufacturing parameter at its limits will call for a design change. This does not change the overall performance requirement of the technology, but it makes the design robust to outlier manufacturing parameters, and helps product yield.

Thus, the foregoing describes a method to identify timing violations that may be outside of the manufacturing specified limits without the need to pessimistically widen the modeling limits. One method of implementation is to use a multi-corner static timing analysis tool which calculates parameter sensitivities such as statistical timing.

When statistical timing analysis runs, it computes a numerically weighted sensitivity for each source of variation and a timing slack (for a given test), which represents a unique combination of sources of variation that lead to the worst possible slack. These two values (variable sensitivity and worst slack) and knowledge of parameter modeling can be used together to focus on timing violations outside of the manufacturing spec limits.

When a variable's sensitivity is computed, the manufacturing ($\pm$3sigma) limits are used. When the worst slack is determined, the variable sensitivity at either +3sigma or −3sigma limits are used. In this way, the worst slack represents timing at the process parameters manufacturing limits A specific process variable initially computed sensitivity can be scaled to a limit beyond $\pm$3sigma and the worst slack can be computed using this new sigma limit (for example, $\pm$4.5sigma. As a result, the timing is not penalized with pessimistic initial results by increasing variable distribution definitions, but the worst slack models this situation.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of embodiments, those skilled in the art will recognize that the embodiments of the invention can be practiced with modification within the spirit and scope of the appended claims.

What is claimed is:

1. A method of identifying a failing measurement manufacturing parameter in an integrated circuit design using a computer, said method comprising:
    selecting, using said computer, a manufacturing measurement parameter of said integrated circuit design;
    selecting, using said computer, a timing test on said integrated circuit design;
    extrapolating, using said computer, a timing slack of said timing test to obtain an adjusted slack criterion with a higher level of coverage with respect to said manufacturing parameter; and
    determining, using said computer, if said adjusted slack is below a required slack in order to identify a failing manufacturing parameter,
    wherein said extrapolation comprises one of a linear extrapolation; a quadratic extrapolation, a high-order extrapolation, and a polynomial extrapolation.

2. The method according to claim 1, wherein said extrapolation comprises a statistical static timing analysis.

3. The method of claim 1, further comprising applying said extrapolation simultaneously to any subset of measurement manufacturing parameters.

4. The method of claim 1, wherein said extrapolation is performed to a wafer acceptance criterion (WAC) limit of said measurement manufacturing parameter.

5. A method of identifying a failing measurement manufacturing parameter in an integrated circuit design using a computer, said method comprising:

selecting, using said computer, a manufacturing measurement parameter of said integrated circuit design;

selecting, using said computer, a timing test on said integrated circuit design;

extrapolating, using said computer, a timing slack of said timing test to obtain an adjusted slack criterion with a higher level of coverage with respect to said manufacturing parameter;

determining, using said computer, if said adjusted slack is below a required slack in order to identify a failing manufacturing parameter; and changing, using said computer, said integrated circuit design with a failing manufacturing parameter to make said integrated circuit design acceptable according to said adjusted slack criterion, wherein said extrapolation comprises one of a linear extrapolation; a quadratic extrapolation, a high-order extrapolation, and a polynomial extrapolation.

* * * * *